United States Patent Office 2,967,209
Patented Jan. 3, 1961

2,967,209

RECOVERY OF RUTHENIUM VALUES

William E. Grummitt and William H. Hardwick, Deep River, Canada, assignors, by mesne assignments, to the United States of America as represented by the United States Atomic Energy Commission No Drawing. Filed June 18, 1948, Ser. No. 33,924

6 Claims. (Cl. 23—87)

This invention relates to the recovery of ruthenium compound in practically pure form from aqueous solutions containing it.

This method of the invention is applicable to the recovery of radioactive isotopes of ruthenium having atomic weights of 103 and 106 as well as small amounts of ruthenium itself. These occur as fission products in neutron irradiated uranium from piles adapted to release atomic energy.

The irradiated uranium is dissolved in nitric acid and most of the uranium is removed from the solution so formed before separating ruthenium from the residual solution by the present method. Some diethyleneglycol-dibutyl-ether or other solvents used in recovering the uranium from the original solution may appear in the residual solution.

It has now been found that ruthenium and its radioactive isotopes having atomic weights 103 and 106 in the octavalent state can be removed from aqueous solutions into a halogen substituted liquid paraffin which is substantially immiscible with the aqueous solution. The preferred reagent is tetrachlorethane but tetrabromethane or carbon tetrachloride or mixtures of the two may be used. However, ruthenium in the octavalent state tends to react with carbon tetrachloride and thus use of the latter requires speed of operation. The preferred solvent is stable to the ruthenium.

The residual solution from the uranium extraction method referred to comprises nitrates of the fission product elements and uranyl nitrate may be present to an amount of 15 to 20 mg. per ml. It may be more or less saturated with ammonium or other nitrate salt, and may contain about 0.7 gram of such salt per ml. It may have a pH of about 0.1, being acid in nitric acid.

In carrying out the method of the present invention the pH of the solution is adjusted to about 1 to 3 by the addition of an appropriate base, such as the hydroxide of sodium, potassium or caesium or ammonia. The latter is preferred. The preferred pH range of the adjusted solution is between 1 and 3. A pH higher than 3 results in the precipitation of a uranium precipitate, while a pH less than 1 is not favourable in the subsequent extraction of ruthenium. Thus the base, preferably ammonia, is added until uranium begins to precipitate and nitric acid is added to bring the pH to the desired value.

It is usually desirable to wash this solution with tetrachlorethane to remove such organic materials as may remain therein from the original solution from which uranium was extracted. About 50% by volume of the aqueous solution of trichlorethane is sufficient to remove such organic material.

The solution is then treated with ammonium ceric nitrate to oxidize the ruthenium to the octavalent state. The ammonium ceric nitrate was added as a solution in water containing 0.25 mg. per ml. but this concentration is not critical. For example, one ml. of the ammonium ceric nitrate solution was added to 4 ml. of the solution containing the ruthenium to oxidize the ruthenium to its octavalent state. To this oxidized solution is added an equal volume of tetrachlorethane which removes the octavalent ruthenium from the aqueous solution. The non-aqueous phase is removed and washed with say 20% of its volume of ammonium ceric nitrate solution to remove contaminants taken up in the non-aqueous phase. Then the non-aqueous phase is treated with acidulated water to recover the ruthenium as pure compound in solution. The water is acidulated to 1 N hydrochloric acid and one-quarter of the volume of the organic extractive of this water may be used. The hydrochloric acid acts as a reductor of the ruthenium which appears in its trivalent state or $RuCl_3$ in the acidulated water. Water acidulated with nitric or sulphuric acid may be used. Formaldehyde or sulphur dioxide may be added if desired to the 1 N hydrochloric acid to speed up reduction and extraction from the non-aqueous phase.

The following specific example is illustrative. 50 ml. of the mentioned residual solution containing $1.0 \times 10^8 \beta$ counts per ml. of ruthenium was adjusted to a pH of between 1 and 3 with ammonia. This solution was treated with 25 ml. of tetrachlorethane to remove any organic solvent remaining therein from previous treatments of the originating solution and the tetrachlorethane phase was removed. The aqueous phase was treated with 10 ml. of an ammonium ceric nitrate solution containing 0.25 mg. per ml. of the ammonium ceric nitrate to oxidize the ruthenium to its octavalent state. This was done at room temperature. 50 ml. of tetrachlorethane was next added to extract the ruthenium from the aqueous phase and the tetrachlorethane phase was removed. By simple settling of the mixed phases, 70% of the ruthenium reported in the tetrachlorethane phase. Centrifuging of the mixed phases recovered 90% of the ruthenium in the non-aqueous phase in two similar successive extraction treatments.

The recovered tetrachlorethane phase was treated with 25 ml. of 1 N hydrochloric acid to recover the ruthenium in aqueous solution. Using simple settling to separate the phases in the tetrachlorethane extraction step, the final product solution obtained contained $6.2 \times 10^7 \beta$ counts per minute of ruthenium 106.

Ruthenium isotopes are an end product of a chain from a fission reaction induced in uranium materials by neutrons. The invention is useful in providing such products in a form adapted for use in the fields of food and medicine and in biological work in methods for the analysis for ruthenium as well as in determining protection of workers in plants processing or handling radioactive materials including fission product materials.

What is claimed is:

1. A method for the recovery of ruthenium from its aqueous solutions comprising oxidizing the ruthenium to the octavalent state and subsequently extracting the ruthenium into a halogen substituted liquid paraffin being one of a group consisting of tetrachlorethane, tetrabromomethane, carbon tetrachloride and mixtures thereof.

2. A method as defined in claim 1 in which the oxidizing agent is ammonium ceric nitrate.

3. A method of recovering ruthenium and its isotopes having an atomic weight 103 and 106 from residual aqueous nitrate solutions which comprises adjusting the pH of the solution to 1 to 3, oxidizing the ruthenium and its isotopes to the octavalent state with ammonium ceric nitrate, extracting the ruthenium and its isotopes from the aqueous phase with tetrachlorethane and separating the phases.

4. A method as defined in claim 3 wherein organic matter is removed from the solution with tetrachlorethane before said oxidizing step.

5. A method as defined in claim 3 wherein the tetrachlorethane phase is treated with acid to render the ruthenium and its isotopes trivalent and recoverable in the aqueous phase and separating the aqueous phase from the tetrachlorethane phase.

6. A method as defined in claim 3 wherein the tetrachlorethane phase is treated with 1 N hydrochloric acid solution and the aqueous phase is separated from the tetrachlorethane phase.

No references cited.